United States Patent [19]

Knobloch et al.

[11] Patent Number: 5,276,258
[45] Date of Patent: Jan. 4, 1994

[54] STABILIZER MIXTURE FOR ELASTOMERS

[75] Inventors: Gerrit Knobloch, Magden; Heinrich Martin, Nunningen, both of Switzerland

[73] Assignee: Ciba-Geigy Corporation, Ardsley, N.Y.

[21] Appl. No.: 984,600

[22] Filed: Dec. 2, 1992

[30] Foreign Application Priority Data

Dec. 6, 1991 [CH] Switzerland ............... 3592/91

[51] Int. Cl.$^5$ .............................................. C08K 5/36
[52] U.S. Cl. ................... 524/114; 524/110; 524/330; 524/333
[58] Field of Search ............... 524/109, 114, 330, 333

[56] References Cited

U.S. PATENT DOCUMENTS

| | | | |
|---|---|---|---|
| 3,361,691 | 1/1968 | Mazzeo | 524/151 |
| 3,658,743 | 4/1972 | Bevilacqua | 524/114 |
| 3,903,173 | 9/1975 | Eggensperger et al. | 524/330 |
| 4,522,965 | 6/1985 | Waniczek et al. | 524/114 |
| 4,741,864 | 5/1988 | Avakian et al. | |
| 4,759,862 | 7/1988 | Meier . | |
| 4,820,756 | 4/1989 | Pitteloud et al. | 524/289 |
| 4,835,200 | 5/1989 | St. Clair . | |
| 4,857,572 | 8/1989 | Meier et al. | 524/289 |
| 5,008,459 | 4/1991 | Meier et al. | |
| 5,059,661 | 10/1991 | Knobloch et al. | 524/330 |
| 5,116,894 | 5/1992 | Knobloch et al. | 524/330 |
| 5,128,397 | 7/1992 | Horsey et al. | 524/330 |

FOREIGN PATENT DOCUMENTS 917100  1/1963  United Kingdom .

Primary Examiner—Veronica P. Hoke
Attorney, Agent, or Firm—Luther A. R. Hall

[57] ABSTRACT

Mixtures composed of a mercaptomethylphenol of the formula

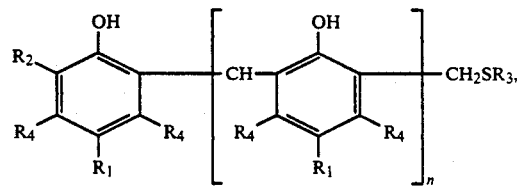

in which n and $R_1$ to $R_4$ are as defined in claim 1, and epoxidised fatty acids or fatty acid esters are suitable, in particular, for stabilisation of compositions which contain elastomers or tackifying resins or elastomers and tackifying resins.

11 Claims, No Drawings

STABILIZER MIXTURE FOR ELASTOMERS

The present invention relates to a novel stabiliser mixture which, in particular, is suitable for use in compositions which contain an elastomer or a tackifying resin or an elastomer and a tackifying resin.

During their preparation, storage, processing and end use, compositions of this type are exposed to a large number of effects which change their properties, usually in an undesired manner. Temperature, atmospheric oxygen, light and also mechanical stresses due to shear forces play an essential role here.

Attempts have been made to counteract these effects by the use of certain stabilisers such as antioxidants, processing stabilisers, metal deactivators and light stabilisers. Thus, for example, it is known from U.S. Pat. Nos. 5,008,459, 4,857,572, 4,820,756, 4,741,864 and 4,759,862 to stabilise elastomer compositions with bis-(alkylmercaptomethyl)phenols. According to U.S. Pat. No. 3,658,743, stabiliser mixtures which comprise a phenol, an organic sulfide or a thioester as well as an epoxide or a phosphite are used to stabilise unsaturated elastomers vulcanisable with sulfur. According to GB-A-917,100, thermoplastic polyolefins can be stabilised with a mixture of an epoxide and an antioxidant such as a phenol or a thiodipropionate.

A novel stabiliser mixture composed of specific mercaptomethylphenols and epoxides has now been found which is suitable in particular for stabilisation of compositions which contain an elastomer or a tackifying resin or an elastomer and a tackifying resin.

Accordingly, the invention provides a stabiliser mixture comprising (a) a mercaptomethylphenol of the formula

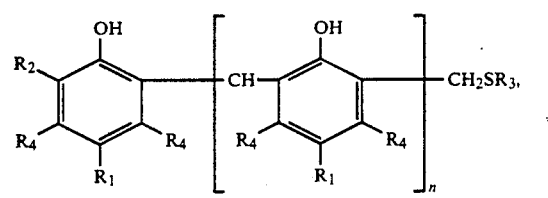

(1)

in which n is 0 or 1, $R_1$ and $R_2$ independently of one another are alkyl having 1 to 12 carbon atoms or a radical of the formula $-CH_2SR_3$, in which $R_3$ is alkyl having 6 to 18 carbon atoms, phenyl or benzyl, and the radicals $R_4$ independently of one another are hydrogen or methyl, radicals $R_4$ bonded to the same ring not simultaneously being methyl, and (b) an epoxidised fatty acid having 3 to 22 carbon atoms or an alkyl ester thereof having 1 to 18 carbon atoms, (a) and (b) being in a weight ratio of 99:1 to 1:10, in particular 10:1 to 1:10.

The invention also provides a composition comprising an elastomer or a tackifying resin or an elastomer and a tackifying resin as well as a stabiliser mixture as defined above, the use of such a mixture for stabilising compositions which comprise an elastomer or a tackifying resin or an elastomer and a tackifying resin and a process for stabilising this composition with the stabiliser mixture.

In component (a), that is to say in the compounds of the formula (1), $R_1$ and $R_2$ independently of one another can be alkyl having 1 to 12 carbon atoms, for example methyl, ethyl, propyl, butyl, hexyl, octyl, undecyl and dodecyl as well as corresponding branched isomers, and also a radical of the formula $-CH_2SR_3$, in which $R_3$, in addition to phenyl or benzyl, can also be alkyl having 6 to 18 carbon atoms, such as hexyl, octyl, nonyl, decyl, dodecyl, tetradecyl and octadecyl or a branched isomer of such radicals.

The compounds of the formula (1), together with their preparation, are described, for example, in U.S. Pat. No. 4,857,572, which has already been mentioned.

The epoxidised fatty acids and fatty acid alkyl esters used as component (b) comprise, for example, epoxidised oleic acid, linoleic acid, linolenic acid, erucacic acid, ricinoleic acid and brassidic acid, which are free or esterified with monohydric or polyhydric alcohols, such as methanol, butanol, lauryl alcohol, octyl alcohol as well as pentaerythritol, glycerol, ethylene glycol, propylene glycol, butylene glycol, neopentyl glycol, mannitol and sorbitol. The said polyhydric alcohols can be completely or partially esterified. Component (b) also comprises mixtures of epoxidised higher fatty acid esters, such as epoxidised cotton seed oil, castor oil, sunflower oil or olive oil, epoxidised tallow or in particular epoxidised soyabean oil or linseed oil.

Such substances are available commercially, for example various soyabean oils are available under the trade names Paraplex ®G-60, G-61 and G-62, Flexol ® EPO and Reoplast ®392.

Component (a) preferably comprises those compounds of the formula (1) in which n is 0 or 1, $R_1$ and $R_2$ independently of one another are alkyl having 1 to 4 carbon atoms or a radical of the formula $-CH_2SR_3$, $R_3$ is alkyl having 6 to 12 carbon atoms and the radicals $R_4$ independently of one another are hydrogen or methyl, radicals $R_4$ bonded to the same ring not simultaneously being methyl.

Amongst these compounds of the formula (1), those in which n is 0, $R_1$ is $-CH_2SC_8H_{17}$, $R_2$ is methyl, $R_3$ is octyl and the radicals $R_4$ are hydrogen are particularly important.

Further preferred groups of compounds of the formula (1) are those in which n is 0, $R_1$ is a radical of the formula $-CH_2SR_3$, $R_3$ is alkyl having 6 to 18 carbon atoms, phenyl or benzyl, $R_2$ is hydrogen or alkyl having 1 to 12 carbon atoms and $R_4$ is hydrogen, and those compounds in which n is 0, $R_1$ is hydrogen or alkyl having 1 to 12 carbon atoms, $R_2$ is a radical of the formula $-CH_2SR_3$, $R_3$ is alkyl having 6 to 18 carbon atoms, phenyl or benzyl and $R_4$ is hydrogen.

Particularly preferred compounds of the formula (1) are those in which n is 0, $R_1$ is a radical of the formula $-CH_2SR_3$, $R_3$ is alkyl having 6 to 18 carbon atoms, phenyl or benzyl, $R_2$ is hydrogen or methyl and $R_4$ is hydrogen.

Component (b) is preferably a mixture of epoxidised fatty acid esters, for example epoxidised castor oil or sunflower oil and in particular epoxidised soyabean oil or linseed oil.

The compositions according to the invention preferably contain from 0.01 to 10% by weight of the stabiliser mixture, with respect to the elastomer or tackifying resin or the elastomer and tackifying resin.

Elastomers which the compositions according to the invention can comprise are, for example:

1. Polydienes, for example polybutadiene, polyisoprene or polychloroprene; block copolymers, for example styrene/butadiene/styrene or styrene/isoprene/styrene; and copolymers such as acrylonitrile/butadiene and styrene/butadiene.

2. Copolymers of monoolefins and diolefins with one another or with other vinyl monomers, for example ethylene-alkyl acrylate copolymers, ethylene-alkyl methacrylate copolymers, ethylene-vinyl acetate copolymers and also terpolymers of ethylene with propylene and a diene; such as hexadiene, dicyclopentadiene or ethylidenenorbornene.

3. Halogen-containing polymers, for example polychloroprene, chlorinated rubber, chlorinated or chlorosulfonated polyethylene, epichlorohydrin homopolymers and copolymers, chorotrifluoroethylene copolymers, polymers of halogen-containing vinyl compounds, for example polyvinylidene chloride and polyvinylidene fluoride; and also their copolymers, such as vinyl chloride-vinylidene chloride, vinyl chloride-vinyl acetate or vinylidene chloride-vinyl acetate.

4. Polyurethanes which are derived from polyethers, polyesters and polybutadiene having terminal hydroxyl groups, on the one hand, and aliphatic or aromatic polyisocyanates, on the other hand, as well as their precursors.

5. Natural rubber.

6. Mixtures (polyblends) of the abovementioned polymers.

7. Aqueous dispersions of naturally occurring or synthetic rubbers, for example natural rubber latex or latices of carboxylated styrene-butadiene copolymers.

If desired, these elastomers are in the form of latices and can be stabilised as such.

Polydienes such as polybutadiene rubber, its copolymers, such as styrene/butadiene rubber or straight-chain or branched styrene/butadiene/styrene and styrene/isoprene/styrene block copolymers, copolymers of ethylene/vinyl acetate or a polyurethane can preferably be used.

Tackifying resins which the compositions according to the invention can comprise are, for example:

Naturally occurring colophony resins (rosins) such as gum rosin, wood rosin or tall oil rosin.

Derivatives of colophony resins, such as glycerol esters and pentaerythritol esters, in each case hydrogenated or non-hydrogenated, disproportionated or non-disproportionated.

Synthetic hydrocarbon resins, in particular having 5 or 9 carbon atoms.

Indene resins, methylindene resins and cumarone-indene resins

Terpene resins

Methylstyrene resins

Phenolic resins

Further tackifying agents such as asphalt or bitumen

Mixtures of the abovementioned resins

Aqueous emulsions of the abovementioned resins.

A synthetic hydrocarbon resin, in particular having 5 or 9 carbon atoms, a colophony resin or a derivative of colophony resins can preferably be used.

The incorporation of the stabiliser mixture according to the invention in the elastomers or tackifying resins or elastomers and tackifying resins can be carried out, for example, by adding corresponding stabiliser solutions or emulsions/dispersions to the polymer solutions or latices before precipitating or by mixing in in accordance with the methods customary in the art, before or during shaping, or also by applying the dissolved or dispersed compounds to the polymer, if appropriate with subsequent evaporation of the solvent. The stabiliser mixture can also be added in the form of a master batch which contains this mixture, for example in a concentration of 2.5 to 25% by weight.

The fact that the stabiliser mixture according to the invention can be used successfully for stabilising tackifying resins is of great importance with regard to the preparation of stabilised adhesives, since tackifying resins are starting materials for adhesives. Therefore, it is already possible to stabilise them at the raw material stage, which can be of importance from the process technology standpoint.

Adhesives are as a rule a composition comprising elastomer, tackifying resin and a wax or oil as further constituent. Suitable waxes for adhesives are, for example, paraffin waxes or microwaxes or Fischer-Tropsch paraffins; they can be of natural or synthetic origin. Examples of oils are aromatic, naphthenic or paraffin oils, which are selected on the basis of, in particular, solubility properties and molecular weight, depending on the application.

In connection with the present invention, compositions which permit use as hot-melt adhesives are of particular interest. These comprise, as elastomer and tackifying resin, the substances listed above as being preferred, in particular straight-chain or branched styrene/butadiene/styrene or styrene/isoprene/styrene block copolymers as well as colophony resins or synthetic hydrocarbon resins. By use of the stabiliser mixture according to the invention it is possible effectively to protect, in particular, hot-melt adhesives of this type against the adverse influences mentioned initially, as a result of which the adhesives retain their original adhesiveness and transparency or light inherent colour for a prolonged period.

Further additives which can be used in the composition according to the invention are, for example:

1. Antioxidants 1.1. and 1.2. alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-i-butylphenol, 2,6-di-cyclopentyl-4-methylphenol, 2-(α-methylcyclohexyl)-4,6-dimethylphenol, 2,6-di-octadecyl-4-methylphenol, 2,4,6-tricyclohexylphenol, 2,6-di-tert-butyl-4-methoxymethylphenol, 2,6-di-nonyl-4-methylphenol, 2,4-dimethyl-6-(1'-methyl-undec-1'-yl)phenol, 2,4-dimethyl-6-(1'-methyl-heptadec-1'-yl)phenol, 2,4-dimethyl-6-(1'-methyl-tridec-1'-yl)phenol and mixtures thereof.

1.2. Alkylthiomethylphenols, for example 2,4-di-octylthiomethyl-6-tert-butylphenol, 2,4-di-octylthiomethyl-6-methylphenol, 2,4-di-octylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, and bis(3,5-di-tert-butyl-4-hydroxyphenyl) adipate.

1.4. Hydroxylated thiodiphenyl ethers, for example 2,2'-thio-bis(6-tert-butyl-4-methylphenol), 2,2'-thio-bis(4-octylphenol), 4,4'-thio-bis(6-tert-butyl-3-methylphenol), 4,4'-thio-bis(6-tert-butyl-2-methylphenol), 4,4'-thio-bis(3,6-di-sec-amylphenol) and 4,4'-bis(2,6-dimethyl-4-hydroxyphenyl) disulfide.

1.5. Alkylidene-bisphenols, for example 2,2′-methylene-bis(6-tertbutyl-4-methylphenol), 2,2′-methylene-bis(6-tert-butyl-4-ethylphenol), 2,2′-methylene-bis[4-methyl-6-(α-methylcyclohexyl)phenol], 2,2′-methylene-bis(4-methyl-6-cyclohexylphenol), 2,2′-methylene-bis(6-nonyl-4-methylphenol, 2,2′-methylene-bis(4,6-di-tert-butylphenol), 2,2′-ethylidene-bis(4,6-di-tert-butylphenol), 2,2′-ethylidene-bis(6-tert-butyl-4-isobutylphenol), 2,2′-methylene-bis[6-(α-methylbenzyl)-4-nonylphenol], 2,2′-methylene-bis[6-(α,α-dimethylbenzyl)-4-nonylphenol], 4,4′-methylene-bis(2,6-di-tert-butylphenol), 4,4′-methylene-bis-(6-tert-butyl-2-methylphenol), 1,1-bis(5-tert-butyl-4-hydroxy-2-methylphenyl)-butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol-bis[3,3-bis(3′-tert-butyl-4′-hydroxyphenyl) butyrate], bis(3-tert-butyl-4-hydroxy-5-methylphenyl)dicyclopentadiene, bis[2-(3′-tert-butyl-2′-hydroxy-5′-methylbenzyl)-6-tert-butyl-4-methylphenyl] terephthalate, 1,1-bis(3,5-dimethyl-2-hydroxyphenyl)-butane, 2,2-bis(3,5-di-tert-butyl-4-hydroxyphenyl)propane, 2,2-bis(5-tert-butyl-4-hydroxy-2-methylphenyl)-4-n-dodecylmercaptobutane and 1,1,5,5-tetra(5-tert-butyl-4-hydroxy-2-methylphenyl)pentane.

1.6. O—, N— and S-benzyl compounds, for example 3,5.3′,5′-tetra-tert-butyl-4,4′-dihydroxydibenzyl ether, octadecyl-4-hydroxy-3,5-dimethylbenzyl mercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, and iso-octyl-3,5-di-tert-butyl-4-hydroxybenzyl mercaptoacetate.

1.7. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl) malonate, di-dodecylmercaptoethyl-2,2-bis-(3,5-di-tert-butyl-4-hydroxybenzyl) malonate, di-[4-(1,1,3,3-tetramethylbutyl)phenyl]-2,2-bis(3,5-di-tert-butyl-4-hydroxybenzyl) malonate.

1.8. Hydroxybenzyl-aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.9. Triazine compounds, for example 2,4-bis-octylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine and 1,3,5-tris(3,5-dicyclohexyl-4-hydroxybenzyl) isocyanurate.

1.10. Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate and the calcium salt of monoethyl 3,5-di-tert-butyl-4-hydroxybenzylphosphonate.

1.11. Acylaminophenols, for example 4-hydroxylauric acid anilide, 4-hydroxystearic acid anilide and octyl N-(3,5-di-tert-butyl-4-hydroxyphenyl)carbamate.

1.12. Esters of β-(3,5-di-tert-butyl-4-hydroxyphenyl)propionic acid with monohydric or polyhydric alcohols, for example with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N′-bis(hydroxyethyl)oxalic acid diamide, 3-thiaundecanol, 3-thiapentadecanol, trimethylhexanediol, trimethylolpropane and 4-hydroxymethyl-1-phospha-2,6,7-trioxabicyclo[2.2.2]octane.

1.13. Esters of β-(5-tert-butyl-4-hydroxy-3-methylphenyl)propionic acid with monohydric or polyhydric alcohols, for example methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N′-bis(hydroxyethyl)oxalic acid diamide, 3-thiaundecanol, 3-thiapentadecanol, trimethylhexanediol, trimethylolpropane and 4-hydroxymethyl-1-phospha-2,6,7-trioxabicyclo[2.2.2]octane.

1.14. Esters of β-(3,5-dicyclohexyl-4-hydroxyphenyl)propionic acid with monohydric or polyhydric alcohols, for example with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N′-bis(hydroxyethyl)oxalic acid diamide, 3-thiaundecanol, 3-thiapentadecanol, trimethylhexanediol, trimethylolpropane and 4-hydroxymethyl-1-phospha-2,6,7-trioxabicyclo[2.2.2]octane.

1.15. Esters of 3,5-di-tert-butyl-4-hydroxyphenyl acetic acid with monohydric or polyhydric alcohols, for example methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N′-bis(hydroxyethyl)oxalic acid diamide, 3-thiaundecanol, 3-thiapentadecanol, trimethylhexanediol, trimethylolpropane and 4-hydroxymethyl-1-phospha-2,6,7-trioxabicyclo[2.2.2]octane.

1.16. Amides of β-(3,5-di-tert-butyl-4-hydroxyphenyl)propionic acid, for example N,N′-bis(3,5-di-tert-butyl-4-hydroxyphenylpropionyl)hexamethylenediamine, N,N′-bis(3,5-di-tert-butyl-4-hydroxyphenylpropionyl)trimethylenediamine and N,N′-bis(3,5-di-tert-butyl-4-hydroxyphenylpropionyl)hydrazine.

2. UV-absorbers and light stabilisers 2.1.2-(2′-Hydroxyphenyl)benzotriazoles, for example 5′-methyl-, 3′,5′-di-tert-butyl-, 5′-tert-butyl-, 5′-(1,1,3,3-tetramethylbutyl)-, 5-chloro-3′,5′-di-tert-butyl-, 5-chloro-3′-tert-butyl-5′-methyl-, 3′-sec-butyl-5′-tert-butyl-, 4′-octoxy-, 3′,5′-di-tert-amyl-, 3′,5′-bis(α,α-dimethylbenzyl)-, a mixture of 5-chloro-3′-tert-butyl-5′-(2-octyloxycarbonylethyl)-and 5-chloro-3′-tert-butyl-5′-[2-(2-ethylhexyloxy)carbonylethyl]-, 5-chloro-3′-tert-butyl-5′-(2-methoxycarbonylethyl)-, 3′-tert-butyl-5′-(2-methoxycarbonylethyl)-, 3′-tert-butyl-5′-(2-octyloxycarbonylethyl)-, 3′-tert-butyl-5′-[2-(2-ethylhexyloxy)carbonylethyl]-, 3′-dodecyl-5′-methyl-and 3′-tert-butyl-5′-(2-isooctyloxycarbonylethyl)-2′-hydroxyphenyl-2H- benzotriazole(2), 2,2'-methylene-bis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$]$_2$, where R = 3'-tert-butyl-4'-hydroxy-5'-2H-benzotriazol-2-ylphenyl.

2.2. 2-Hydroxybenzophenone, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

2.3. Esters of substituted or unsubstituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert.butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate and 2-methyl-4,6-di-tert-butylphenyl 3,5-di-tert-butyl-4-hydroxybenzoate.

2.4. Acrylates, for example ethyl and isooctyl α-cyano-β,β-diphenylacrylate, methyl α-carbomethoxycinnamate, methyl and butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis[4-(1,1,3,3-tetramethylbutyl)phenol], such as the 1:1 or 1:2 complex, if desired with additional ligands, such as n-butylamine, triethanolamine or N-cyclohexyldiethanolamine, nickel dibutyldithiocarbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methylphenylundecylketoxime and nickel complexes of 1-phenyl-4-lauroyl-5-hydroxypyrazole, if desired with additional ligands.

2.6. Sterically hindered amines, for example bis(2,2,6,6-tetramethyl-piperidyl) sebacate, bis(2,2,6,6-tetramethylpiperidyl) succinate, bis(1,2,2,6,6-pentamethylpiperidyl) sebacate, bis(1,2,2,6,6-pentamethylpiperidyl) n-butyl-3,5-di-tert-butyl-4-hydroxybenzylmalonate, the condensation product of 1-hydroxyethyl-2,2,6,6-tetramethyl-4-hydroxypiperidine and succinic acid, the condensation product of N,N'-bis(2,2,6,6-tetramethyl-4-piperidyl)-hexamethylenediamine and 4-tert-octylamino-2,6-dichloro-1,3,5-s-triazine, tris(2,2,6,6-tetramethyl-4-piperidyl) nitriloacetate, tetrakis(2,2,6,6-tetramethyl-4-piperidyl) 1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl) 2-n-butyl-2-(2-hydroxy-3,5-di-tert-butyl-benzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the condensation product of N,N'-bis(2,2,6,6-tetramethyl-4-piperidyl)hexamethylenediamine and 4-morpholino-2,6-dichloro-1,3,5-triazine, the condensation product of 2-chloro-4,6-di(4-n-butylamino-2,2,6,6-tetramethylpiperidyl)-1,3,5-triazine and 1,2-bis(3-aminopropylamino)ethane, the condensation product of 2-chloro-4,6-di(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione and 3-dodecyl-1-(1,2,2,6,6-pentamethyl-4-piperidyl)pyrrolidine-2,5-dione.

2.7. Oxalic acid diamide, for example 4,4'-dioctyloxyoxanilide, 2,2'-dioctyloxy-5,5'-di-tert-butyloxanilide, 2,2'-di-dodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide, and mixtures of o- and p-methoxy- and also of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine.

3. Metal deactivators, for example N,N'-diphenyloxalic acid diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic acid dihydrazide, oxanilide, isophthalic acid dihydrazide, sebacic acid bis-phenylhydrazide, N,N'-diacetaladipic acid dihydrazide, N,N'-bis-salicyloyloxalic acid dihydrazide, and N,N'-bis-salicyloylthiopropionic acid dihydrazide.

4. Phosphites and phosphonites, for example triphenyl phosphite, diphenylalkyl phosphites, phenyldialkyl phosphites, tris(nonylphenyl) phosphite, Trilauryl phosphite, trioctadecyl phosphite, distearylpentaerythritol diphosphite, tris(2,4-di-tert-butylphenyl) phosphite, diisodecylpentaerythritol diphosphite, bis(2,4-di-tert-butylphenyl)pentaerythritol diphosphite, bis(2,6-di-tert-butyl-4-methylphenyl)pentaerythritol diphosphite, bis-isodecyloxypentaerythritol diphosphite, bis(2,4-di-tert-butyl-6-methylphenyl)pentaerythritol diphosphite, bis(2,4,6-tri-tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine and 6-fluoro-2,4,8,10-tetra-tert-butyl-12-methyldibenz[d,g]-1,3,2-dioxaphosphocine.

5. Peroxide-destroying compounds, for example esters of β-thiodipropionic acid, for example the lauryl, stearyl, myristyl or tridecyl ester, mercaptobenzimidazole, the zinc salt of 2-mercaptobenzimidazole, zinc dibutyldithiocarbamate, dioctadecyl disulfide and pentaerythritol tetrakis(β-dodecylmercapto)propionate.

6. Polyamide stabilisers, for example copper salts in combination with iodides and/or phosphorus compounds and salts of divalent manganese.

7. Basic costabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate, potassium palmitate, antimony pyrocatechinate or tin pyrocatechinate.

8. Nucleating agents, for example 4-tert-butylbenzoic acid, adipic acid and diphenyl acetic acid.

9. Fillers and reinforcing agents, for example calcium carbonate, silicates, glass fibres, talc, kaolin, mica, barium sulfate, metal oxides and metal hydroxides, carbon black and graphite.

10. Other additives, for example plasticisers, lubricants, emulsifiers, pigments, fluorescent whitening agents, flameproofing agents, antistatic agents and propellants.

11. Crosslinking agents, such as organic peroxides, sulfur, zinc oxide, stearic acid and vulcanisation accelerators.

The following examples illustrate the invention in more detail. Parts and percentages are by weight.

EXAMPLE 1

Preparation of the Stabiliser Mixture

Stabiliser mixtures can be prepared by simple mixing of components (a) and (b) in any of the possible weight ratios. In detail, the procedure is that the mixture is heated to about 120° C., while stirring, left at this temperature for 2 hours and then allowed to cool. The stabiliser mixtures thus obtained are virtually odour-free.

EXAMPLE 2

Preparation and Ageing of a Hot-Melt Adhesive a) 100 parts of ESCOREZ ® 5380 (a synthetic hydrogenated hydrocarbon resin as tackifying resin), 50 parts of SHELLFLEX ® 451 (a naphthenic mineral oil as plasticiser) and, where appropriate, stabiliser mixture in the amounts indicated below are mixed at 175° C., with stirring, in a laboratory mixer to give a homogeneous melt. 50 parts of CARIFLEX ® 1107 (a straight-chain styrene/isoprene/styrene block copolymer as elastomer) are added to the melt in portions. After a total of 2 hours the mixing operation is complete. Samples comprising 20 parts are filled into glass dishes and these are covered with an aluminium foil. Ageing of the samples takes place in a circulating air oven at 170° C. for a period of 3 days. The results are shown in Table 1.

TABLE 1

| Stabiliser | Gardner colour (DIN 6161) after ageing at 170° C. | | | |
|---|---|---|---|---|
| | 0 days | 1 day | 2 days | 3 days |
| Control | 3–4 | 6+ | 7–8 | 10 |
| 0.6% A | 3–4 | 6+ | 6–7 | 9 |
| 0.6% B | 3–4 | 6+ | 6–7 | 7–8 |
| 0.3% A 0.3% B | 3–4 | 5+ | 5+ | 5+ |

A is a compound of the formula (1) in which n is O, $R_1$ is —$CH_2SC_8H_{17}$, $R_2$ is methyl, $R_3$ is octyl and the radicals $R_4$ are hydrogen; B is an epoxidised soyabean oil (Reoplast ® 392).

b) The procedures described under a) are repeated except that the elastomer used is 50 parts of FINAPRENE ®F 424 (a branched styrene/isoprene/styrene block copolymer). The results are shown in Table 2.

TABLE 2

| Stabiliser | Gardner colour (DIN 6161) after ageing at 170° C. | | | |
|---|---|---|---|---|
| | 0 days | 1 day | 2 days | 3 days |
| Control | 3+ | 4–5 | 7–8 | 9+ |
| 0.6% A | 3 | 4–5 | 6+ | 7 |
| 0.6% B | 3 | 6+ | 6–7 | 8 |

TABLE 2-continued

| Stabiliser | Gardner colour (DIN 6161) after ageing at 170° C. | | | |
|---|---|---|---|---|
| | 0 days | 1 day | 2 days | 3 days |
| 0.3% A 0.3% B | 3 | 4 | 5–6 | 6 |

It can be seen from the tables that the stabilising capacity of the corresponding mixture is superior to the action of the individual components A and B.

What is claimed is:

1. A stabilized composition which comprises
(A) an elastomer, tackifying resin or an elastomer and tackifying resin, with the proviso that ethylene/vinyl acetate copolymers containing synthetic hydrocarbon tackifying resins are excluded, and
(B) an effective stabilizing amount of a stabilizer mixture which is
(a) a mercaptomethylphenol of the formula

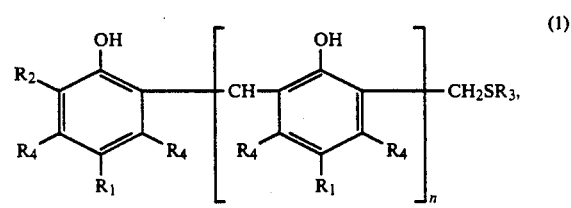

in which
n is 0 or 1,
$R_1$ and $R_2$ independently of one another are alkyl having 1 to 12 carbon atoms or a radical of the formula —$CH_2SR_3$, in which $R_3$ is alkyl having 6 to 18 carbon atoms, phenyl or benzyl, and the radicals $R_4$ independently of one another are hydrogen or methyl, radicals $R_4$ bonded to the same ring not simultaneously being methyl, and, when n is 0 and $R_1$ or $R_2$ is —$CH_2SR_3$, $R_1$ or $R_2$ may also be hydrogen, and
(b) an epoxidized fatty acid having 3 to 22 carbon atoms or an alkyl ester thereof having 1 to 18 carbon atoms,
with (a) and (b) being in a weight ratio of 99:1 to 1:10.

2. A stabilized composition according to claim 1, wherein (a) and (b) are present in a weight ratio of 10:1 to 1:10.

3. A stabilized composition according to claim 1, where in (a), n is 0 or 1, $R_1$ and $R_2$ independently of one another are alkyl having 1 to 4 carbon atoms or a radical of the formula —$CH_2SR_3$, $R_3$ is alkyl having 6 to 12 carbon atoms and the radicals $R_4$ independently of one another are hydrogen or methyl, radicals $R_4$ bonded to the same ring not simultaneously being methyl.

4. A stabilized composition according to claim 1, where in (a), n is 0, $R_1$ is —$CH_2SC_8H_{17}$, $R_2$ is methyl, $R_3$ is octyl and $R_4$ are hydrogen.

5. A stabilized composition according to claim 1, where in (a), n is 0, $R_1$ is a radical of the formula —$CH_2SR_3$ in which $R_3$ is alkyl having 6 to 18 carbon atoms, phenyl or benzyl, $R_2$ is hydrogen or alkyl having 1 to 12 carbon atoms and $R_4$ is hydrogen.

6. A stabilized composition according to claim 1, where in (a), n is 0, $R_1$ is hydrogen or alkyl having 1 to 12 carbon atoms, $R_2$ is a radical of the formula —$CH_2SR_3$, $R_3$ is alkyl having 6 to 18 carbon atoms, phenyl or benzyl and $R_4$ is hydrogen.

7. A stabilized composition according to claim 1, where in (a), n is 0, $R_1$ is a radical of the formula —$CH_2SR_3$, $R_3$ is alkyl having 6 to 18 carbon atoms, phenyl or benzyl, $R_2$ is hydrogen or methyl and $R_4$ is hydrogen.

8. A stabilized composition according to claim 1, wherein (b) is a mixture of epoxidized fatty acid esters.

9. A composition according to claim 8 wherein epoxidized fatty acid esters are epoxidized soybean oil or linseed oil.

10. A composition according to claim 1, containing, as elastomer, a straight-chain or branched styrene/butadiene/styrene or styrene/isoprene/styrene block copolymer and, as tackifying resin, a colophony resin or a synthetic hydrocarbon resin.

11. A process for stabilizing compositions comprising an elastomer, a tackifying resin or an elastomer and a tackifying resin which comprises incorporating therein an effective stabilizing amount of a stabilizer mixture according to claim 1.

* * * * *